United States Patent
Sharma et al.

(10) Patent No.: US 11,553,334 B1
(45) Date of Patent: Jan. 10, 2023

(54) USER EQUIPMENT (UE) IDENTIFICATION IN A WIRELESS COMMUNICATION NETWORK

(71) Applicant: T-Mobile Innovations LLC, Overland Park, KS (US)

(72) Inventors: Anuj Sharma, Broadlands, VA (US); Anil Kumar Mariyani, Ashburn, VA (US); Deepesh Belwal, Ashburn, VA (US); Rajil Malhotra, Olathe, KS (US); Sriharsha Nagaraja Kadalbal, Sammamish, WA (US); Dipta Moy Biswas, Bothell, WA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 49 days.

(21) Appl. No.: 17/331,442

(22) Filed: May 26, 2021

(51) Int. Cl.
 *H04M 3/00* (2006.01)
 *H04W 8/26* (2009.01)

(52) U.S. Cl.
 CPC ...................... *H04W 8/26* (2013.01)

(58) Field of Classification Search
 CPC ........................................ H04W 8/26
 USPC ....................................... 455/418
 See application file for complete search history.

(56) References Cited

U.S. PATENT DOCUMENTS

| | | | |
|---|---|---|---|
| 10,397,892 B2 | 8/2019 | Vrzic et al. | |
| 10,419,979 B2 | 9/2019 | Youn et al. | |
| 10,448,239 B2 | 10/2019 | Faccin et al. | |
| 10,462,840 B2 | 10/2019 | Dao et al. | |
| 10,827,448 B2 | 11/2020 | Kim et al. | |
| 2015/0304836 A1* | 10/2015 | Anslot | H04W 4/70 455/433 |
| 2019/0200207 A1* | 6/2019 | Lauster | H04W 8/12 |
| 2019/0342851 A1 | 11/2019 | Shan et al. | |

* cited by examiner

*Primary Examiner* — Mark G. Pannell

(57) ABSTRACT

In a wireless communication network, Unified Data Repositories (UDRs) determine initial User Equipment Identifiers (UE IDs). The UDRs successfully synchronize the initial UE IDs and serve the initial UE IDs to network elements that use the initial UE IDs to serve wireless data communications to UEs. The UDRs determine additional UE IDs. The UDRs unsuccessfully synchronize the additional UE IDs and serve the additional UE IDs to the network elements. In response to the unsuccessful synchronization of the additional UE IDs, a UDR recovery system reallocates the additional UE IDs. The UDR recovery system successfully synchronizes the reallocated-additional UE IDs. The network elements use the initial UE IDs and the reallocated-additional UE IDs to serve the wireless data communications.

20 Claims, 9 Drawing Sheets

USER EQUIPMENT (UE) IDENTIFICATION IN A WIRELESS COMMUNICATION NETWORK

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications that use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Interworking Functions (IWFs), Access and Mobility Management Functions (AMFs), Session Management Functions (SMFs), User Plane Functions (UPFs), Policy Control Functions, (PCFs), Network Exposure Functions (NEFs), Unified Data Management (UDMs), Uniform Data Repositories (UDRs), and the like.

The UDRs store and serve user data for the wireless user devices like device identifiers, subscribed services, and service policies. The device identifiers may be Subscriber Permanent Identifiers (SUPIs). The subscribed services may comprise network names and slices for network products like internet-access, low-power communications, media-streaming, and robotic control. The service policies indicate user information like service quality, geographic restrictions, and data limits.

To authenticate a wireless user device, the wireless communication network issues a random number to the wireless use device which hashes its SUPI and the random number to generate and transfer a hash result back to the network. The wireless communication network hashes the expected SUPI and the random number to generate an expected hash result and matches the device's hash result to the expected hash result to properly identify the wireless user device. The network elements retrieve data for the authenticated wireless user device from the UDR like SUPI, subscribed services, and service policies. The network elements deliver the subscribed services to the wireless user device based on the service policies.

When multiple UDRs are used, the UDRs synchronize their SUPIs with one another to avoid duplicate SUPIs. When different wireless user devices are issued a duplicate SUPI, one of these devices will likely get locked out and lose its subscribed services. The locked-out wireless user device re-acquires the subscribed services when the device operator contacts the wireless communication network in response to the loss-of-service, and the network reconfigures the wireless user device with a new SUPI. New SUPIs are constantly required for new and reconfigured wireless user devices. When the multiple UDRs cannot synchronize their SUPIs, duplicate SUPIs and the resulting wireless communication service disruptions become a serious risk. Unfortunately, the UDRs do not effectively handle UDR communication outages. Moreover, the UDRs do not efficiently manage the risk of duplicate SUPIs.

Technical Overview

In a wireless communication network, Unified Data Repositories (UDRs) determine initial User Equipment Identifiers (UE IDs). The UDRs successfully synchronize the initial UE IDs and serve the initial UE IDs to network elements that use the initial UE IDs to serve wireless data communications to UEs. The UDRs determine additional UE IDs. The UDRs unsuccessfully synchronize the additional UE IDs and serve the additional UE IDs to the network elements. In response to the unsuccessful synchronization of the additional UE IDs, a UDR recovery system reallocates the additional UE IDs. The UDR recovery system successfully synchronizes the reallocated-additional UE IDs. The network elements use the initial UE IDs and the reallocated-additional UE IDs to serve the wireless data communications.

DETAILED DESCRIPTION

Figure 1:
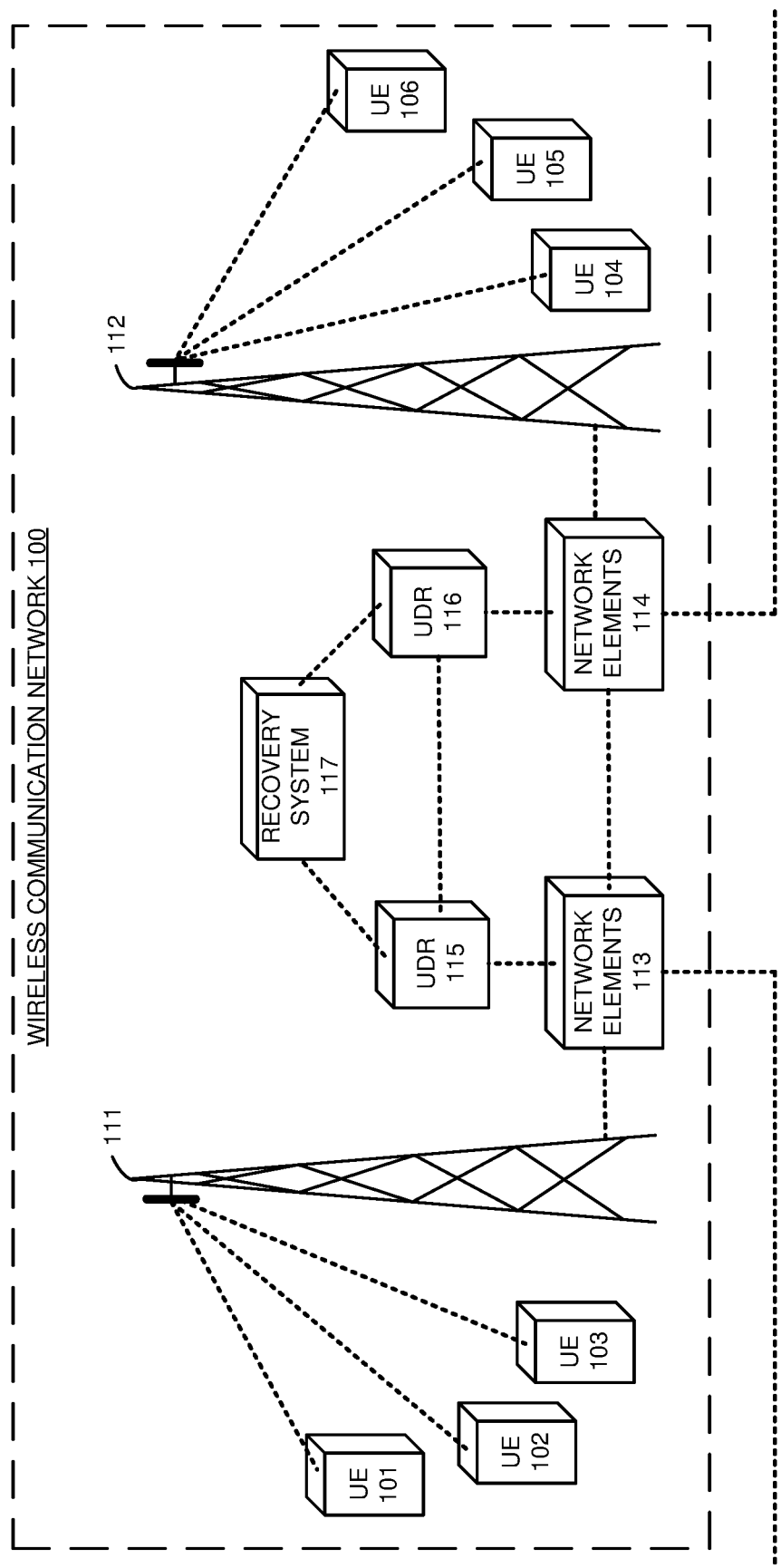
FIG. 1 illustrates a wireless communication network to identify wireless User Equipment (UEs).

FIG. 1 illustrates wireless communication network 100 to identify wireless User Equipment (UEs) 101-106. UEs 101-106 comprise computers, phones, vehicles, sensors, robots, or some other data appliances with data communication circuitry. Wireless communication network 100 comprises Radio Access Networks (RANs) 111-112, network elements 113-114, Unified Data Repositories (UDRs) 115-116, and recovery system 117. Wireless communication network 100 is simplified and typically includes more UEs, RANs, network elements, and UDRs than shown.

Various examples of network operation and configuration are described herein. In some examples, UDRs 115-116 determine UE Identifiers (IDs) for UE 101 and UE 104. UDRs 115-116 successfully synchronize the UE IDs with one another to avoid duplicate UE IDs. UDR 115 serves the UE ID for UE 101 to network elements 113. UDR 116 serves the UE ID for UE 104 to network elements 114. Network elements 113-114 use the UE IDs to serve wireless data communications to UE 101 and UE 104. UE 101 wirelessly exchanges network signaling and user data with RAN 111. RAN 111 exchanges network signaling and user data with network elements 113 to serve UE 101. UE 104 wirelessly exchanges network signaling and user data with RAN 112. RAN 112 exchanges network signaling and user data with network elements 114 to serve UE 104.

UDRs 115-116 then determine UE IDs for UE 102 and UE 105. UDRs 115-116 are not able to successfully synchronize these UE IDs with one another, so the UE IDs for UE 102 and UE 105 may be duplicates. UDR 115 serves the UE ID for UE 102 to network elements 113. UDR 116 serves the UE ID for UE 105 to network elements 114. Network elements 113-114 use the UE IDs to serve wireless data communications to UE 102 and UE 105. UE 102 wirelessly exchanges network signaling and user data with RAN 111. RAN 111 exchanges network signaling and user data with network elements 113 to serve UE 102. UE 105 wirelessly exchanges network signaling and user data with RAN 112. RAN 112 exchanges network signaling and user data with network elements 114 to serve UE 105. When the UE IDs for UE 102 and UE 105 are duplicates, network elements 113 and UDR 115 may serve UE 102 but would likely not serve UE 105 when it presents its duplicate UE ID. Likewise, network elements 114 and UDR 116 may serve UE 105 but would likely not serve UE 102 when it presents its duplicate ID.

UDRs 115-116 then determine UE IDs for UE 103 and UE 106. UDRs 115-116 successfully synchronize these UE IDs with one another to avoid duplicates. UDR 115 serves the UE ID for UE 103 to network elements 113. UDR 116 serves the UE ID for UE 106 to network elements 114. Network elements 113-114 use the UE IDs to serve wireless data communications to UE 103 and UE 106. UE 103 wirelessly exchanges network signaling and user data with RAN 111. RAN 111 exchanges network signaling and user data with network elements 113 to serve UE 103. UE 106 wirelessly exchanges network signaling and user data with RAN 112. RAN 112 exchanges network signaling and user data with network elements 114 to serve UE 106.

In response to the unsuccessful synchronization of the UE IDs for UE 102 and UE 105, UDR recovery system 117 reallocates the UE IDs to avoid duplication. UDR recovery system 117 successfully synchronizes the reallocated UE IDs and indicates the reallocated-synchronized UE IDs to UDRs 115-116. UDR 115 serves the reallocated-synchronized UE ID for UE 102 to network elements 113. UDR 116 serves the reallocated-synchronized UE ID for UE 106 to network elements 114. Network elements 113-114 use the reallocated-synchronized UE IDs to serve wireless data communications to UE 102 and UE 105. Since the UE IDs for UE 102 and UE 105 are not duplicates, network elements 113 and UDR 115 would now serve UE 105 when it presents its reallocated-synchronized UE ID. Likewise, network elements 114 and UDR 116 would serve UE 102 when it presents its reallocated-synchronized UE ID. Advantageously, UDRs 115-116 effectively handle their communication outages. Moreover, UDRs 115-116 efficiently manage the risk of duplicate SUPIs through automatic replacement.

The UE IDs comprise Subscriber Permanent Identifiers (SUPIs), Subscriber Identity Module (SIM) codes, or some other data that uniquely identifies individual UEs 101-106. Network elements 113-114 comprise Interworking Functions (IWFs), Access and Mobility Management Functions (AMFs), Session Management Functions (SMFs), User Plane Functions (UPFs), Policy Control Functions, (PCFs), Network Exposure Functions (NEFs), Unified Data Management (UDMs), and the like. Although not required, UDRs 115-116 may be located in different geographic areas.

In some examples, recovery system 117 is integrated within at least one of UDRs 115-116.

UEs 101-106 wirelessly communicate with RANs 111-112 over technologies like Institute of Electrical and Electronic Engineers (IEEE) 802.11 (WIFI), Fifth Generation New Radio (5GNR), Long Term Evolution (LTE), Low-Power Wide area Network (LP-WAN), or some other wireless communication protocol. RANs 112-113, network elements 113-114, UDRs 115-116, and recovery system 117 communicate over metallic wiring, glass fibers, radio channels, or some other communication media. The data links use IEEE 802.3 (Ethernet), Time Division Multiplex (TDM), Data Over Cable System Interface Specification (DOCSIS), WIFI, 5GNR, LTE, IP, General Packet Radio Service Transfer Protocol (GTP), virtual switching, inter-processor communication, bus interfaces, and/or some other data communication protocols. UEs 101-106 and RANs 111-112 comprise radios. UEs 101-106, RANs 112-113, network elements 113-114, UDRs 115-116, and recovery system 117 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
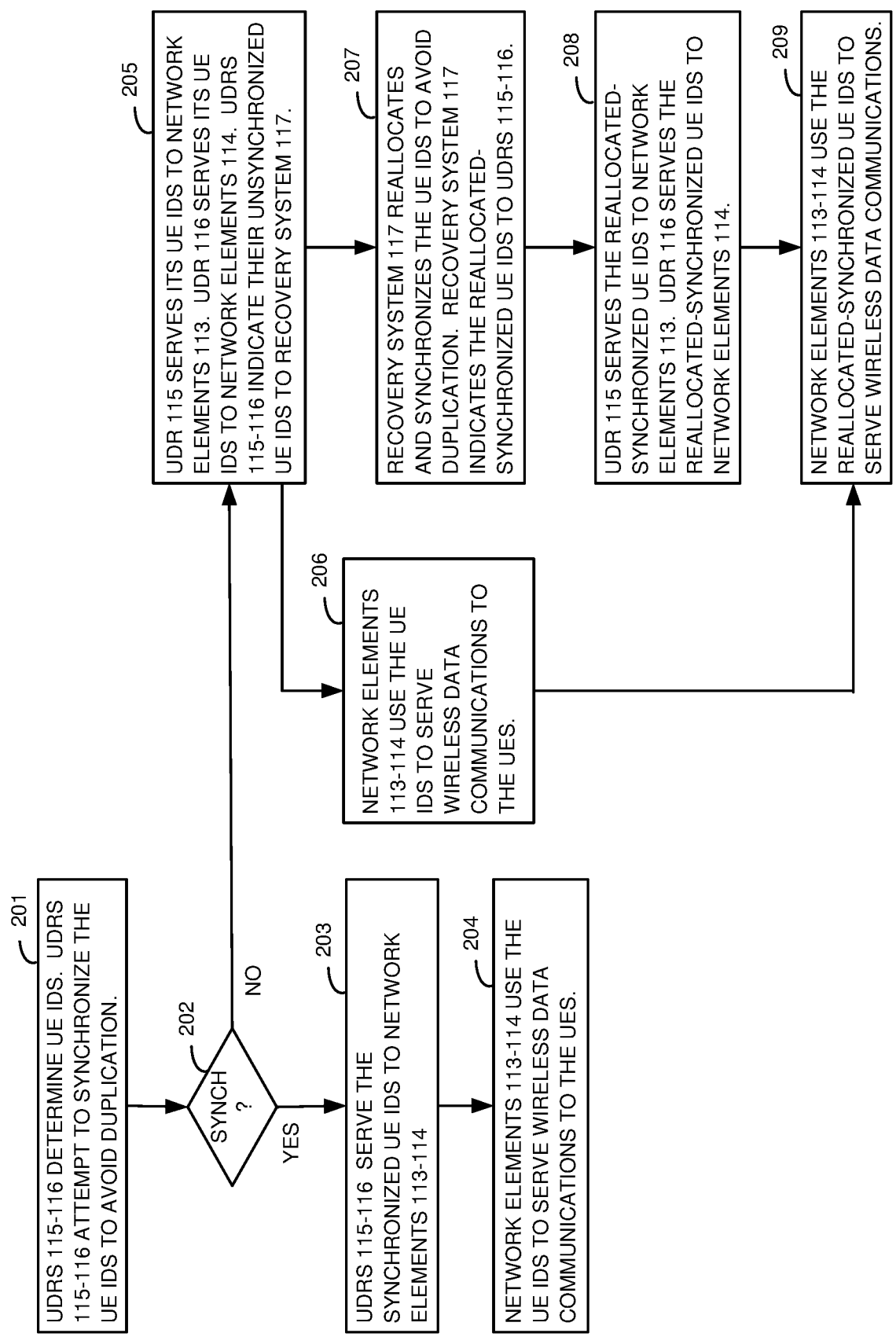
FIG. 2 illustrates an exemplary operation of the wireless communication network to identify the wireless UEs.

FIG. 2 illustrates an exemplary operation of wireless communication network 100 to identify wireless UEs 101-106. UDRs 115-116 determine UE IDs (201). UDRs 115-116 attempt to synchronize the UE IDs to avoid duplication (201). When the UE IDs are successfully synchronized (202), UDRs 115-116 serve the UE IDs to network elements 113 (203), and network elements 113-114 use the UE IDs to serve wireless data communications to the UEs (204). When the UE IDs are not successfully synchronized (202), UDR 115 serves its UE IDs to network elements 113, and UDR 116 serves its UE IDs to network elements 114 (205). UDRs 115-116 also indicate the unsynchronized UE IDs to recovery system 117 (205). Network elements 113-114 use the unsynchronized UE IDs to serve wireless data communications to the UEs (206). Recovery system 117 reallocates and synchronizes the UE IDs to avoid duplication (207). Recovery system 117 indicates the reallocated-synchronized UE IDs to UDRs 115-116 (207). UDR 115 serves the reallocated-synchronized UE IDs to network elements 113. UDR 116 serves the reallocated-synchronized UE IDs to network elements 114 (208). Network elements 113-114 use the reallocated-synchronized UE IDs to serve wireless data communications (209).

Figure 3:
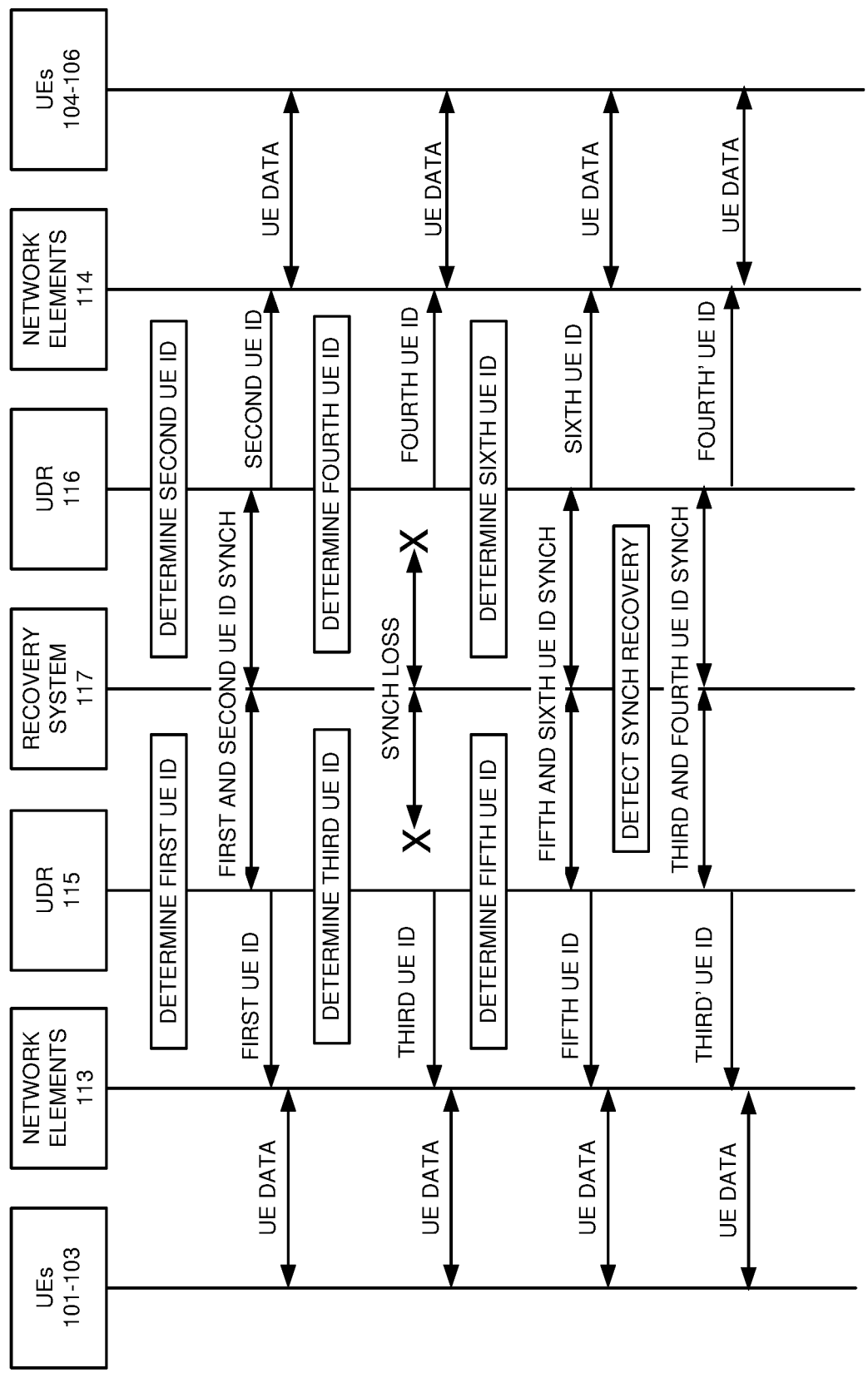
FIG. 3 illustrates an exemplary operation of the wireless communication network to identify the wireless UEs.

FIG. 3 illustrates an exemplary operation of wireless communication network 100 to identify wireless UEs 101-106. In this example, UDRs 115-116 synchronize all of their UE IDs through recovery system 117, although this differs from other examples. UDR 115 determines a first UE ID for UE 101, and UDR 116 determines a second UE ID for UE 104. UDRs 115-116 successfully synchronize the first and second UE IDs over recovery system 117. Recovery system 117 may log and pass the UE IDs for synchronization by UDRs 115-116, or recovery system 117 may receive, synchronize, and indicate the synchronized UE IDs to UDRs 115-116. UDR 115 serves the synchronized first UE ID to network elements 113. UDR 116 serves the synchronized second UE ID to network elements 114. Network elements 113 use the first UE ID to exchange UE data with UE 101. Network elements 114 use the second UE ID to exchange UE data with UE 104. UE 101 may also use its synchronized first UE ID with network elements 114, and UE 104 may use its synchronized second UE ID with network elements 113.

UDR 115 determines a third UE ID for UE 102, and UDR 116 determines a fourth UE ID for UE 105. UDRs 115-116 cannot successfully synchronize the third and fourth UE IDs over recovery system 117—typically due to a UDR networking issue. UDR 115 serves the unsynchronized third UE ID to network elements 113. UDR 116 serves the unsynchronized fourth UE ID to network elements 114. Network elements 113 use the third UE ID to exchange UE data with UE 102. Network elements 114 use the fourth UE ID to exchange UE data with UE 105. UE 102 may have a problem using its unsynchronized third UE ID with network elements 114, and UE 105 may have trouble using its unsynchronized fourth UE ID with network elements 113.

UDR 115 determines a fifth UE ID for UE 103, and UDR 116 determines a sixth UE ID for UE 106. UDRs 115-116 successfully synchronize the fifth and sixth UE IDs over recovery system 117. UDR 115 serves the synchronized fifth UE ID to network elements 113. UDR 116 serves the synchronized sixth UE ID to network elements 114. Network elements 113 use the fifth UE ID to exchange UE data with UE 103. Network elements 114 use the sixth UE ID to exchange UE data with UE 106. UE 103 may also use its synchronized fifth UE ID with network elements 114, and UE 106 may use its synchronized sixth UE ID with network elements 113.

Recovery system 117 detects the successful synchronization for the first and second UE IDs, the unsuccessful synchronization for the third and fourth UE IDs, and the loss-of-synchronization for the fifth and sixth UE IDs. In response, recovery system 117 reallocates and synchronizes the unsynchronized third and fourth UE IDs. The reallocated-synchronized third UE ID is now designated as third' and the reallocated-synchronized fourth UE ID is now designated as fourth'. The reallocated-synchronized UE IDs avoid duplication with one another and with prior UE IDs for UEs 101, 103, 104, and 106. Recovery system 117 indicates the reallocated-synchronized third' UE ID to UDR 115. Recovery system 117 indicates the reallocated-synchronized fourth' UE ID to UDR 116. UDR 115 serves the reallocated-synchronized third' UE ID to network elements 113. UDR 116 serves the reallocated-synchronized fourth' UE ID to network elements 114. Network elements 113-114 use the reallocated-synchronized third' UE ID and fourth' UE ID to serve UEs 102 and 105. UE 102 may also use its synchronized third' UE ID with network elements 114, and UE 105 may use its synchronized fourth' UE ID with network elements 113.

Figure 4:
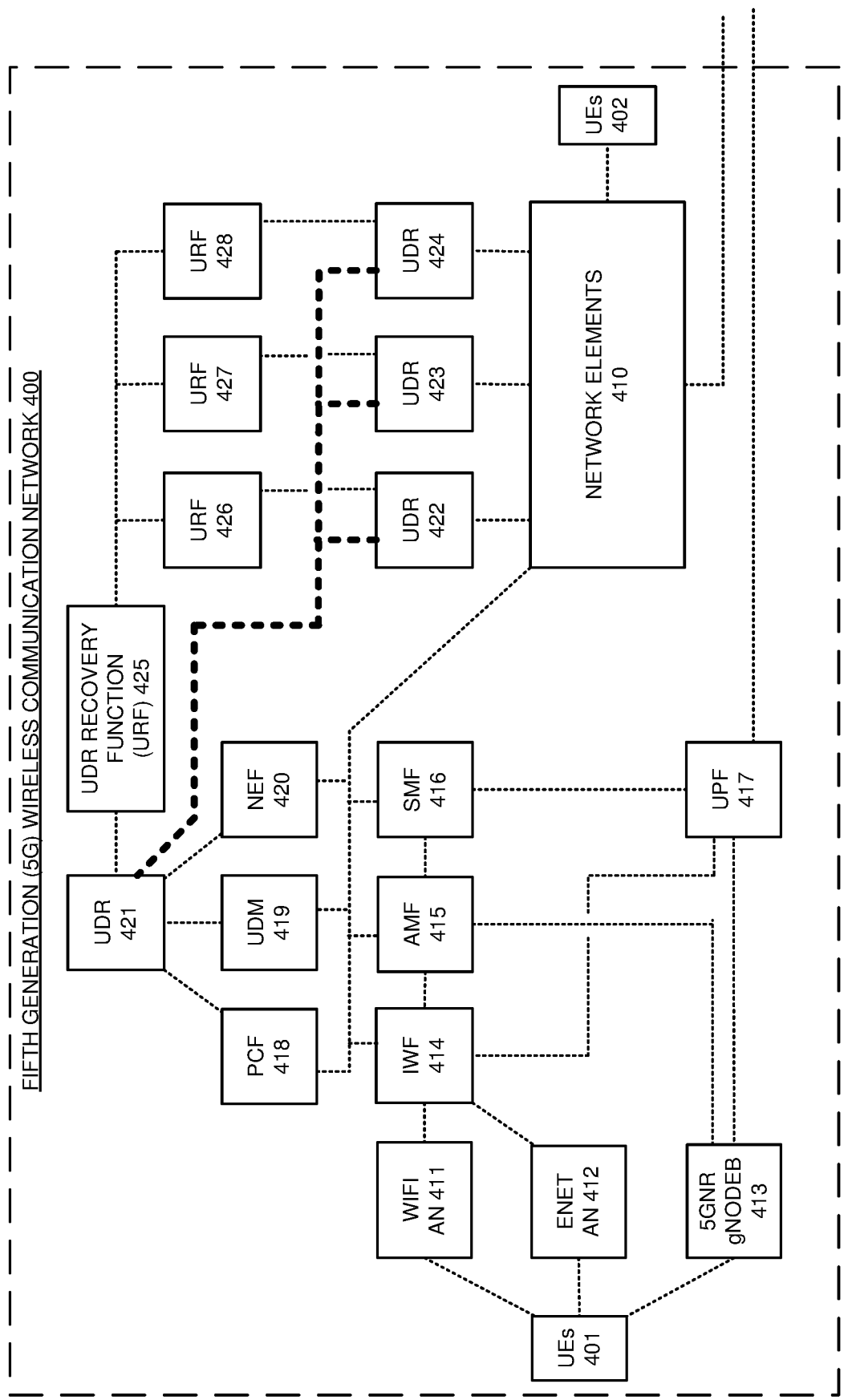
FIG. 4 illustrates a Fifth Generation (5G) wireless communication network to identify wireless UEs.

FIG. 4 illustrates Fifth Generation (5G) wireless communication network 100 to identify wireless UEs 101-103. 5G wireless communication network 400 comprises an example of wireless communication network 100, although network 100 may differ. 5G wireless communication network 400 comprises: UEs 401-402, network elements 410, WIFI Access Node (AN) 411, Ethernet (ENET) AN 412, SGNR gNodeB 413, non-3GPP Interworking Function (IWF) 414, Access and Mobility Management Function (AMF) 415, Session Management Function (SMF) 416, User Plane Function (UPF) 417, Policy Control Function (PCF) 418, Unified Data Manager (UDM) 419, Network Exposure Function (NEF) 420, Unified Data Repositories (UDR) 421-424, UDR Recovery Functions (URFs) 425-428. Network elements 410 comprise ANs, gNodeBs, IWFs, AMFs, SMFs, UPFs, PCFs, UDMs, and NEFs. UDRs 421-424 are be located in different geographic areas. In some examples, URFs 425-428 are integrated within at least one and possibly all of UDRs 421-424.

UEs 401 and UPF 417 exchange user data over at least one of the following data paths: WIFI AN 411-IWF 414, ENET AN 412-IWF 414, or SGNR gNodeB 413. UPF 417 may exchange the user data with external systems like the internet. To enable the wireless data services, UDRs 421-424 first determine individual Subscriber Permanent Identifiers (SUPIs) for individual UEs 401-402. UDRs 421-424 successfully synchronize the SUPIs to avoid duplication. A duplicate SUPI may eventually cause confusion and possibly a sudden loss-of-service for one of UEs 401-402 that shares the duplicate SUPI.

UDR 421 serves some of the SUPIs to PCF 418, UDM 419, and NEF 420. PCF 418, UDM 419, and NEF 420 use the SUPIs to deliver wireless data services to UEs 401. For example, UDM 419 and AMF 415 authenticate individual UEs 401 by verifying their individual SUPIs. PCF 418 and UDM 419 store network policies and service qualities for individual UEs 401 in UDR 421 in association with their individual SUPIs. NEF 420 stores network event and status information for individual UEs 401 in UDR 421 in association with their individual SUPIs —typically for exposure to other network functions. UDRs 422-424 serve the other SUPIs to the PCFs, UDMs, and NEFs in network elements 410. The PCFs, UDMs, and NEFs use the other SUPIs to deliver the wireless data services to UEs 402.

UDRs 421-424 monitor the quality of their data communications during the SUPI synchronization process. In particular, UDRs 421-424 monitor error rate and communication delay on communications traffic between UDRs 421-424. When the error rate and/or the communication delay exceed thresholds that correlate to faulty synchronization, UDRs 421-424 note their own SUPIs that they independently generate and serve out to 5G wireless communication network 400. For example, communications between UDRs 421-424 may go down for several hours, and UDRs 421-424 would record the new SUPIs that they generate and serve during the outage.

When the error rate and/or the communication delay improve (and fall below the thresholds) to levels that indicate adequate synchronization, UDRs 421-424 transfer their noted SUPIs to URFs 425-428 and stop noting new SUPIs for URF resolution. URFs 425-428 process the noted SUPIs in from the newest to the oldest to identify duplicate SUPIs if any. When a duplicate SUPI is encountered, URFs 425-428 award that SUPI to the one of UEs 401-402 that was most recently given that SUPI, and URFs 425-428 generate and synchronize a new SUPI for the losing one of UEs 401-402 that had the duplicate SUPI longer.

URFs 425-428 indicate the now synchronized SUPIs to UDRs 421-424. UDRs 421-424 receive the synchronized SUPIs from URFs 425-428 and responsively swap out the old and noted SUPIs with the new and synchronized SUPIs across network 400. For example, UDR 421 might instruct PCF 418 to replace a duplicate SUPI for one of UEs 401 with a new and synchronized SUPI. UDR 422 might instruct a NEF in network elements 410 to replace a duplicate SUPI for one of UEs 402 with a new and synchronized SUPI.

Figure 5:
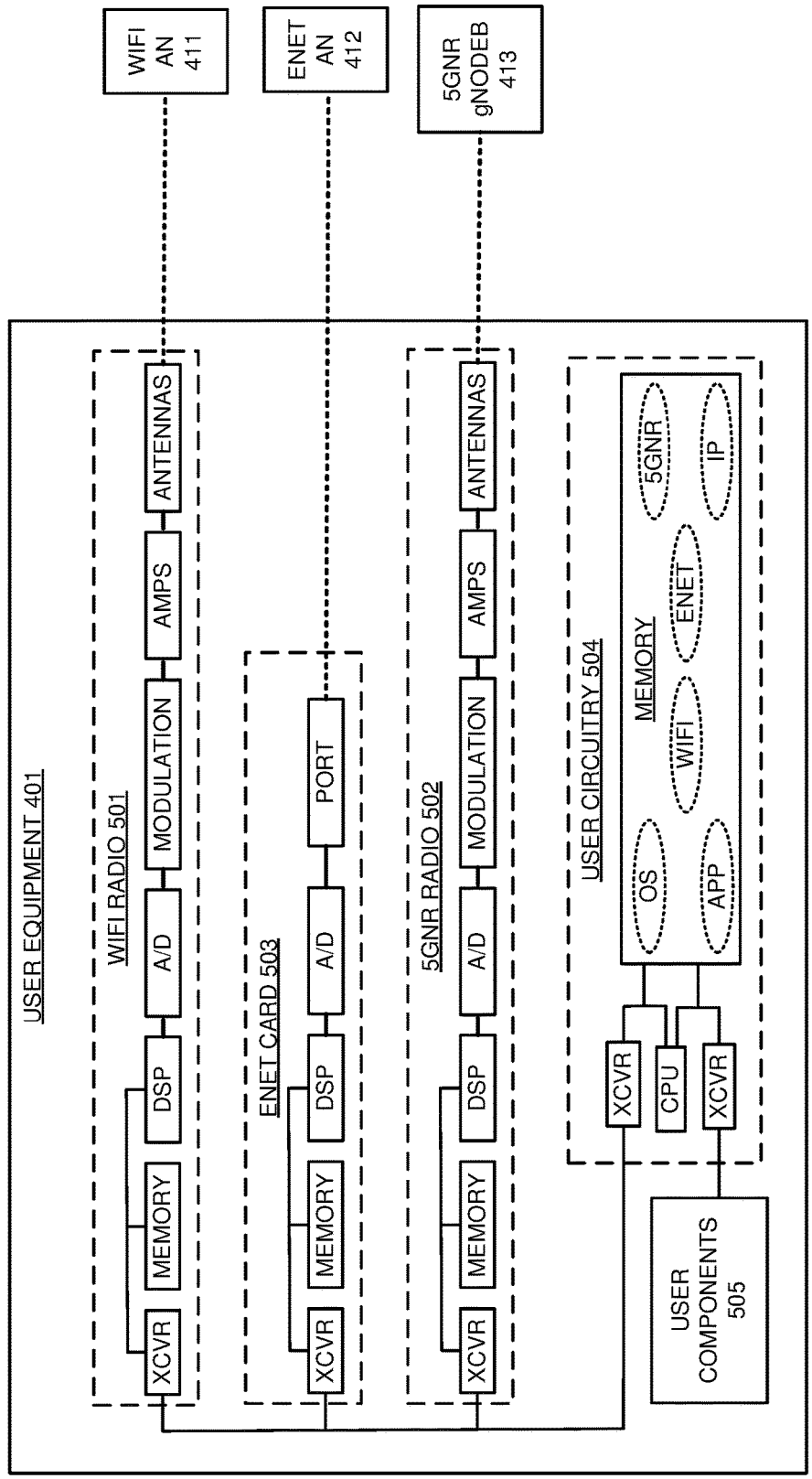
FIG. 5 illustrates a UE in the 5G wireless communication network.

FIG. 5 illustrates one of UEs 401 in 5G wireless communication network 400. UE 401 comprises an example of UEs 101-102 and 402, although UEs 101-102 and 402 may differ. UE 401 comprises WIFI radio 501, SGNR radio 502, Ethernet (ENET) card 503, user circuitry 504, and user components 505. Radios 501-502 comprises antennas, amplifiers, filters, modulation, analog-to-digital interfaces, DSP, memory, and transceivers that are coupled over bus circuitry. Ethernet card 503 comprises ports, analog-to-digital interfaces, DSP, memory, and transceivers that are coupled over bus circuitry. User circuitry 504 comprises memory, CPU, user interfaces and components, and transceivers that are coupled over bus circuitry. The memory in user circuitry 504 stores an operating system, user apps (APP), and network applications for WIFI, ENET, SGNR, and IP. The network applications comprise components like Physical Layer (PHY), Media Access Control (MAC), Radio Link Control (RLC), Packet Data Convergence Protocol (PDCP), Service Data Adaption Protocol (SDAP), and Radio Resource Control (RRC).

The antennas in WIFI radio 501 are wirelessly coupled to WIFI AN 411 over a WIFI link. The antennas in 5GNR radio 502 are wirelessly coupled to 5GNR gNodeB 413 over a 5GNR link. The port in ENET card 503 is wireline coupled to ENET AN 412 over an Ethernet link. Transceivers (XCVRs) in radios 501-502 and card 503 are coupled to transceivers in user circuitry 504. Transceivers in user circuitry 504 are coupled to user components 505 like displays, controllers, interfaces, and memory. The CPU in user circuitry 504 executes the operating system, user apps, and network applications to exchange network signaling and user data with: WIFI AN 411 over WIFI radio 501, ENET AN 412 over ENET card 503, and 5GNR gNodeB 413 over 5GNR radio 502. Some of the WIFI, ENET, and/or 5GNR components could be omitted from UE 401. UE 401 could be a WIFI-only device, ENET-only device, WIFI/ENET device, 5GNR/WIFI device, or use some other technology combination device.

Figure 6:
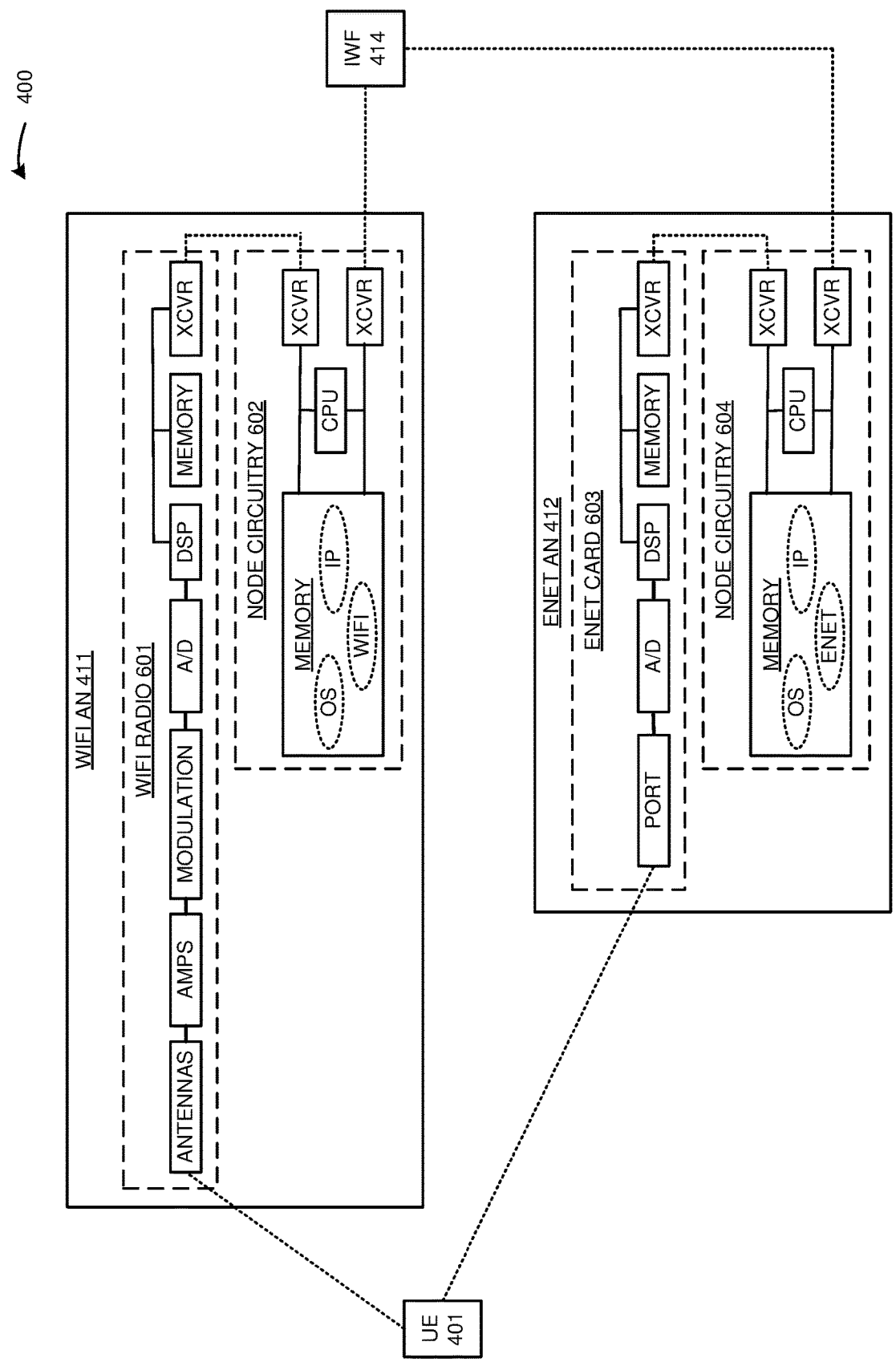
FIG. 6 illustrates non-3GPP access nodes in the 5G wireless communication network.

FIG. 6 illustrates non-3GPP ANs 411-412 in 5G wireless communication network 400. Non-3GPP access nodes 411-412 comprise an example of RANs 111-112, although RANs 111-112 may differ. WIFI AN 411 comprises WIFI radio 601 and node circuitry 602. WIFI radio 601 comprises antennas, amplifiers, filters, modulation, analog-to-digital interfaces, DSP, memory, and transceivers that are coupled over bus circuitry. Node circuitry 602 comprises memory, CPU, user interfaces and components, and transceivers that are coupled over bus circuitry. The memory in node circuitry 602 stores an operating system, user applications, and network applications for IP and WIFI. The antennas in WIFI radio 601 are wirelessly coupled to UE 401 over a WIFI link. Transceivers in WIFI radio 601 are coupled to transceivers in node circuitry 602. Transceivers in node circuitry 602 are coupled to transceivers in IWF 414. The CPU in node circuitry 602 executes the operating systems, user applications, and network applications to exchange network signaling and user data with UE 401 and with IWF 414.

ENET AN 412 comprises ENET card 603 and node circuitry 604. ENET card 603 comprises ports, analog-to-digital interfaces, DSP, memory, and transceivers that are coupled over bus circuitry. Node circuitry 604 comprises memory, CPU, user interfaces and components, and transceivers that are coupled over bus circuitry. The memory in node circuitry 604 stores an operating system, user applications, and network applications for IP and ENET. The ports in ENET card 603 are wireline coupled to UE 401 over an ENET link. Transceivers in ENET card 603 are coupled to transceivers in node circuitry 604. Transceivers in node circuitry 604 are coupled to transceivers in IWF 414. The CPU in node circuitry 604 executes the operating systems, user applications, and network applications to exchange network signaling and user data with UEs 401 and with IWF 414.

Figure 7:
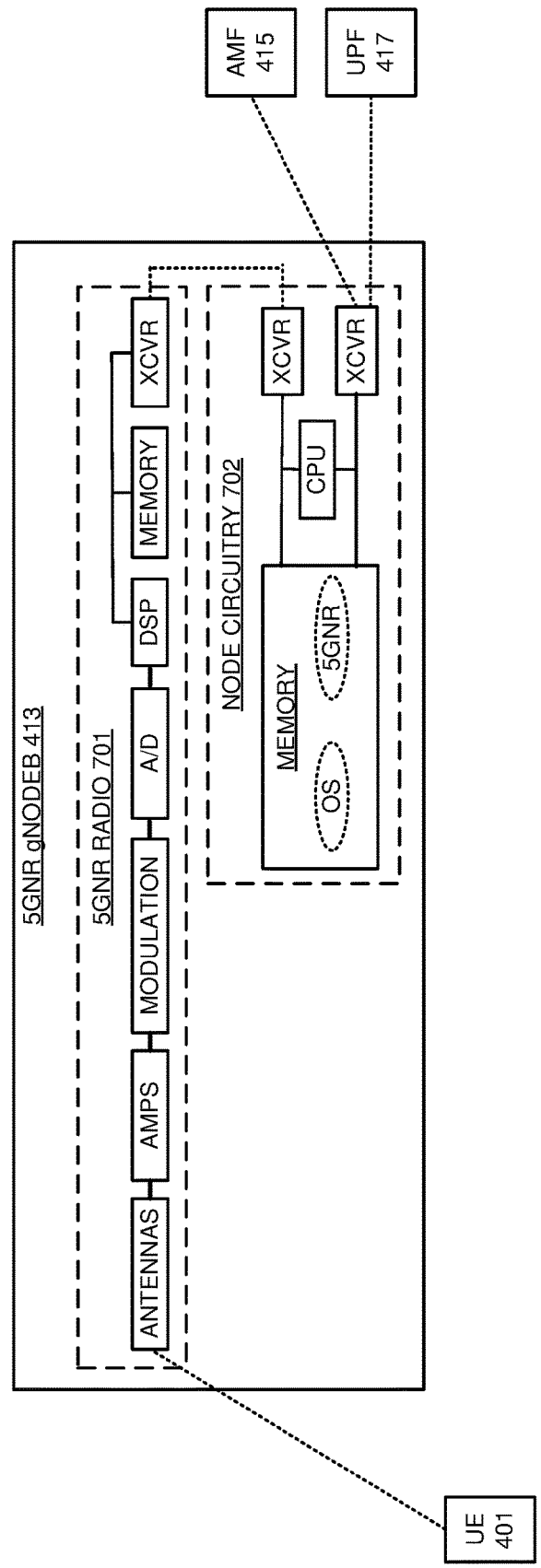
FIG. 7 illustrates a 5G New Radio (5GNR) gNodeB in the 5G wireless communication network.

FIG. 7 illustrates 5G New Radio (5GNR) gNodeB 413 in 5G wireless communication network 400. 5GNR gNodeB 413 comprises an example of RANs 111-112, although RANs 111-112 may differ. 5GNR gNodeB 413 comprises 5GNR radio 701 and node circuitry 702. 5GNR radio 701 comprises antennas, amplifiers, filters, modulation, analog-to-digital interfaces, DSP, memory, and transceivers that are coupled over bus circuitry. Node circuitry 702 comprises memory, CPU, user interfaces and components, and transceivers that are coupled over bus circuitry. The memory in node circuitry 702 stores an operating system, user applications, and network applications for IP and 5GNR. The antennas in 5GNR radio 701 are wirelessly coupled to UE 401 over a 5GNR link. Transceivers in 5GNR radio 701 are coupled to transceivers in node circuitry 702. Transceivers in node circuitry 702 are coupled to transceivers in AMF 415 and UPF 417. The CPU in node circuitry 702 executes the operating systems, user applications, and network applications to exchange network signaling and user data with UEs 401, AMF 415 and UPF 417.

Figure 8:
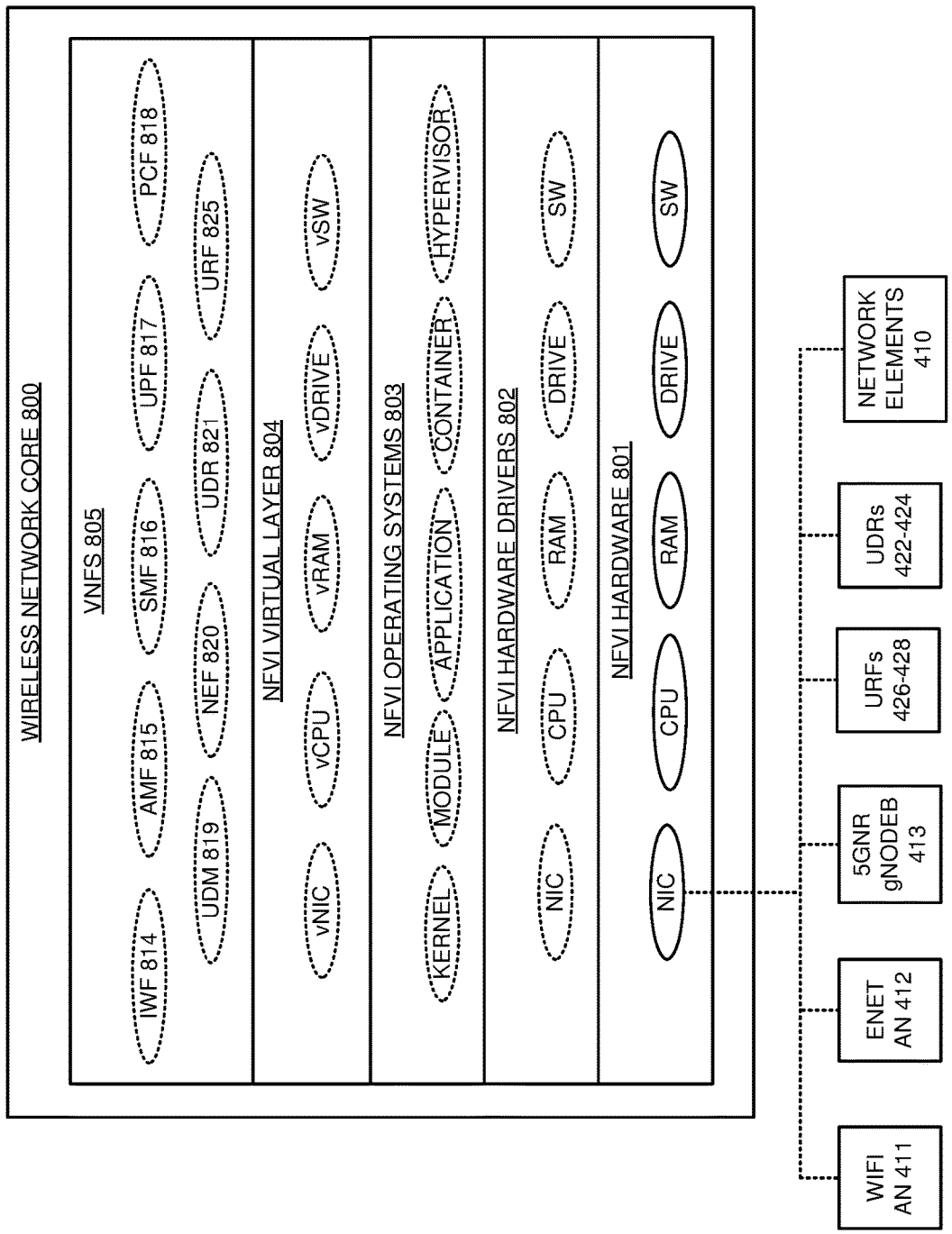
FIG. 8 illustrates a wireless network core in the 5G wireless communication network.

FIG. 8 illustrates wireless network core 800 in the 5G wireless communication network. Wireless network core 800 comprises an example of network elements 113-114, UDRs 115-116, and recovery system 117, although these components of network 100 may differ. Wireless network core 800 comprises Network Function Virtualization Infrastructure (NFVI) hardware 801, NFVI hardware drivers 802, NFVI operating systems 803, NFVI virtual layer 804, and NFVI Virtual Network Functions (VNFs) 805. NFVI hardware 801 comprises Network Interface Cards (NICs), CPU, RAM, Flash/Disk Drives (DRIVE), and Data Switches (SW). NFVI hardware drivers 802 comprise software that is resident in the NIC, CPU, RAM, DRIVE, and SW. NFVI operating systems 803 comprise kernels, modules, applications, containers, hypervisors, and the like. NFVI virtual layer 804 comprises vNIC, vCPU, vRAM, vDRIVE, and vSW. NFVI VNFs 805 comprise non-3GPP Interworking Function (IWF) 814, Access and Mobility Management Function (AMF) 815, SMF Session Management Function (SMF) 816, User Plane Function (UPF) 817, Policy Control Function (PCF) 818, Unified Data Management (UDM) 819, Network Exposure Function (NEF 820), Unified Data Repository (UDR) 821, and UDR Recovery Function (URF) 825. Other VNFs like Authentication Server Function (AUSF) and Network Repository Function (NRF) are typically present but are omitted for clarity.

Wireless network core 800 may be located at a single site or be distributed across multiple geographic locations. The NIC transceivers in NFVI hardware 801 are coupled to WIFI AN 411, ENET AN 412, SGNR gNodeB 413, URFs 426-428, UDRs 422-424, and network elements 410. NFVI hardware 801 executes NFVI hardware drivers 802, NFVI operating systems 803, NFVI virtual layer 804, and NFVI VNFs 805 to form and operate IWF 414, AMF 415, SMF 416, UPF 417, PCF 418, UDM 419, NEF 420, UDR 421, and URF 425.

Figure 9:
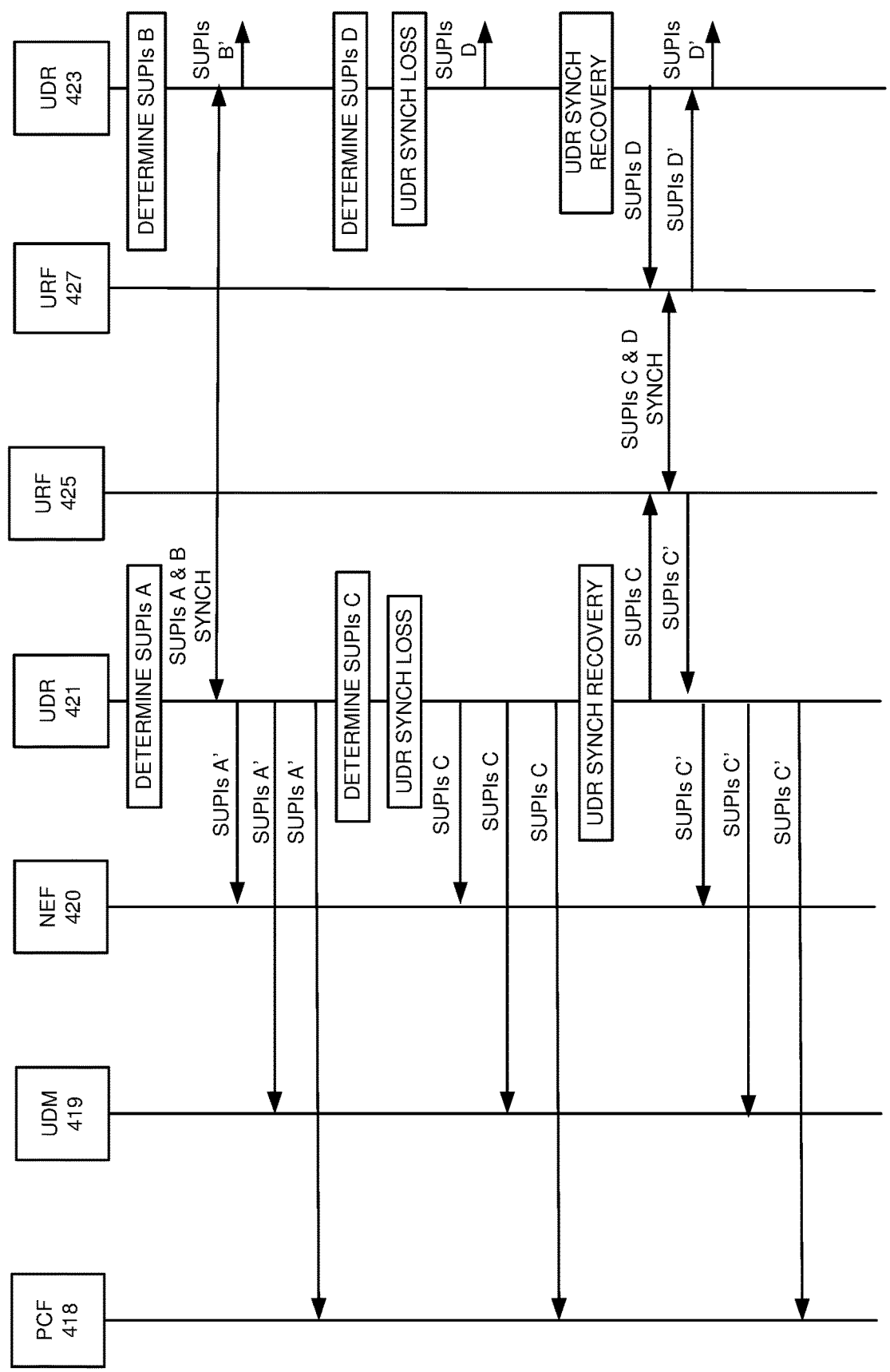
FIG. 9 illustrates an exemplary operation of the 5G wireless communication network to identify the wireless UEs.

FIG. 9 illustrates an exemplary operation of 5G wireless communication network 400 to identify wireless UEs 401-402. UDR 421 generates a batch of Subscriber Permanent Identifiers (SUPIs) referred to as SUPIs "A". UDR 423 also generates a batch of SUPIs referred to as SUPIs "B". UDRs 421 and 423 successfully synchronize the SUPIs A and SUPIs B to avoid duplication—and any duplicate SUPIs are reallocated to remove the duplication. The synchronized SUPIs are now referred to as SUPIs A' and SUPIs B'. UDR 421 serves synchronized SUPIs A' to PCF 418, UDM 419, and NEF 420. PCF 418, UDM 419, and NEF 420 use SUPIs A' to deliver wireless data services. UDR 423 serves synchronized SUPIs B' to network elements 410 (not shown here) which use SUPIs B' to deliver wireless data services.

UDR 421 generates another batch of SUPIs "C", and UDR 423 generates another batch of SUPIs "D". UDRs 421 and 423 cannot successfully synchronize the SUPIs C and SUPIs D due to a UDR network outage. SUPIs C and SUPIs D may include duplicates. UDR 421 serves unsynchronized SUPIs C to PCF 418, UDM 419, and NEF 420. PCF 418, UDM 419, and NEF 420 use unsynchronized SUPIs C to deliver wireless data services. UDR 423 serves unsynchronized SUPIs D to network elements 410 (not shown here) which use unsynchronized SUPIs D to deliver wireless data services.

UDRs 421 and 423 monitor the monitor error rate and communication delay on their synchronization communications. When the error rate and/or the communication delay exceed thresholds that correlate to faulty synchronization, UDR 421 and UDR 423 note and time stamp the SUPIs that they serve out. UDR 421 notes and time stamps SUPIs C, and UDR 423 notes and time stamps SUPIs D. When the error rate and/or the communication delay improve to deliver adequate synchronization, UDR 421 transfers the noted and time-stamped SUPIs C to URF 425, and UDR 423 transfers the noted and time-stamped SUPIs D to URF 427. URF 425 and URF 427 process the SUPIs C and SUPIs D in from newest to oldest to identify duplicate SUPIs if any. When a duplicate SUPI is are encountered, URFs 425 and 427 award the SUPI to the newest time-stamp. URFs 425 and 427 generate and synchronize a new SUPI to replace the duplicate SUPI having the older time-stamp.

URF 425 indicates the synchronized SUPIs C' to UDR 421. URF 427 indicates the synchronized SUPIs D' to UDR 423. UDR 421 receives the synchronized SUPIs C' from URF 425 and responsively swaps out any old duplicate SUPIs C with their new synchronized SUPIs C' in PCF 418, UDM 419, and NEF 420. UDR 423 receives the synchronized SUPIs D' from URF 425 and responsively swaps out any old duplicate SUPIs D with their new synchronized SUPIs D' in network elements 410.

The wireless data network circuitry described above comprises computer hardware and software that form special-purpose networking circuitry to identify wireless UEs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose networking circuitry to identify wireless UEs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless communication network to identify wireless User Equipment (UEs), the method comprising:
   Unified Data Repositories (UDRs) determining initial UE Identifiers (IDs), successfully synchronizing the initial UE IDs across the UDRs, and serving the initial UE IDs to network elements that use the initial UE IDs to serve wireless data communications;
   the UDRs determining additional UE IDs, unsuccessfully synchronizing the additional UE IDs across the UDRs, and serving the additional UE IDs to the network elements that use the initial UE IDs and the additional UE IDs to serve the wireless data communications; and
   in response to the unsuccessful synchronization of the additional UE IDs across the UDRs, a UDR recovery system reallocating the additional UE IDs, successfully synchronizing the reallocated-additional UE IDs across the UDRs, and serving the reallocated-additional UE IDs to the network elements that use the initial UE IDs and the reallocated-additional UE IDs to serve the wireless data communications.

2. The method of claim 1 wherein the UE IDs comprise Subscriber Permanent Identifiers (SUPIs).

3. The method of claim 1 wherein the UE IDs comprise Subscriber Identity Module (SIM) codes.

4. The method of claim 1 wherein at least one of the network elements comprises a Policy Control Function (PCF).

5. The method of claim 1 wherein at least one of the network elements comprises a Network Exposure Function (NEF).

6. The method of claim 1 wherein at least one of the network elements comprises a Unified Data Management (UDM).

7. The method of claim 1 wherein different ones of the of the UDRs are located in different geographic areas.

8. The method of claim 1 wherein the UDR recovery system is integrated within at least one the UDRs.

9. The method of claim 1 wherein the UDR recovery system reallocating the additional UE IDs comprises reallocating newer ones of the additional UE IDs before reallocating older ones of the additional UE IDs.

10. The method of claim 1 wherein the UDR recovery system reallocating the additional UE IDs in response to the unsuccessful synchronization of the additional UE IDs across the UDRs comprises detecting at least one of excessive delay and excessive error over a data communication network between the UDRs, and in response, reallocating the additional UE IDs.

11. A wireless communication network to identify wireless User Equipment (UEs), the wireless communication network comprising:
Unified Data Repositories (UDRs) configured to determine initial UE Identifiers (IDs), successfully synchronize the initial UE IDs across the UDRs, and serve the initial UE IDs to network elements that use the initial UE IDs to serve wireless data communications;
the UDRs configured to determine additional UE IDs, unsuccessfully synchronize the additional UE IDs across the UDRs, and serve the additional UE IDs to the network elements that use the initial UE IDs and the additional UE IDs to serve the wireless data communications; and
in response to the unsuccessful synchronization of the additional UE IDs across the UDRs, a UDR recovery system configured to reallocate the additional UE IDs, successfully synchronize the reallocated-additional UE IDs across the UDRs, and serve the reallocated-additional UE IDs to the network elements that use the initial UE IDs and the reallocated-additional UE IDs to serve the wireless data communications.

12. The wireless communication network of claim 11 wherein the UE IDs comprise Subscriber Permanent Identifiers (SUPIs).

13. The wireless communication network of claim 11 wherein the UE IDs comprise Subscriber Identity Module (SIM) codes.

14. The wireless communication network of claim 11 wherein at least one of the network elements comprises a Policy Control Function (PCF).

15. The wireless communication network of claim 11 wherein at least one of the network elements comprises a Network Exposure Function (NEF).

16. The wireless communication network of claim 11 wherein at least one of the network elements comprises a Unified Data Management (UDM).

17. The wireless communication network of claim 11 wherein different ones of the of the UDRs are located in different geographic areas.

18. The wireless communication network of claim 11 wherein the UDR recovery system is integrated within at least one the UDRs.

19. The wireless communication network of claim 11 wherein the UDR recovery system is configured to reallocate newer ones of the additional UE IDs before reallocating older ones of the additional UE IDs.

20. The wireless communication network of claim 11 wherein the UDR recovery system is configured to detect at least one of excessive delay and excessive error over a data communication network between the UDRs, and in response, reallocate the additional UE IDs.

* * * * *